United States Patent [19]
Rigaux et al.

[11] Patent Number: 5,575,568
[45] Date of Patent: Nov. 19, 1996

[54] ENCODER DEVICE FOR A ROTATIONAL SPEED SENSOR AND ROLLING-CONTACT BEARING EQUIPPED WITH SUCH A DEVICE

[75] Inventors: Christian Rigaux, Artannes-sur-Indre; Jean-François Maestrati, Joue-les-Tours, both of France

[73] Assignee: S.K.F. France, Clamart Cedex, France

[21] Appl. No.: 594,151

[22] Filed: Jan. 31, 1996

[30] Foreign Application Priority Data

Feb. 9, 1995 [FR] France .................................. 95 01515

[51] Int. Cl.⁶ .................................................... F16C 19/08
[52] U.S. Cl. ........................... 384/448; 384/446; 324/174
[58] Field of Search ......................... 384/448, 446, 384/544, 589; 324/174

[56] References Cited

U.S. PATENT DOCUMENTS

| | | |
|---|---|---|
| 5,131,763 | 7/1992 | Caron ........................................ 384/448 |
| 5,143,458 | 9/1992 | Alff et al. .................................. 384/448 |

FOREIGN PATENT DOCUMENTS

| | | |
|---|---|---|
| 375019 | 6/1990 | European Pat. Off. . |
| 420041 | 4/1991 | European Pat. Off. . |
| 2655735 | 6/1991 | France . |
| 2259987 | 3/1993 | United Kingdom . |

*Primary Examiner*—Lenard A. Footland
*Attorney, Agent, or Firm*—Beveridge, DeGrandi, Weilacher & Young

[57] ABSTRACT

Encoder device for a rotational speed sensor of a rotating member of the bearing (1) mounted on a non-rotating member of the said bearing (1), of the type comprising a sensor (7) which is secured to an element that is fixed relative to the non-rotating member and in front of which an element forming a rotor moves in rotation with a small air gap, which element is equipped with an encoder (12) in the form of a multipole magnetized ring, capable of producing in the sensor a periodic signal of frequency proportional to the speed of rotation of the rotor element. The encoder (12) is fixed to an internal face of a rigid protection and support element (13) made of nonmagnetic metallic material, a corresponding external face of the protection element (13) moving in rotation in front of the sensor (7).

21 Claims, 7 Drawing Sheets

5,575,568

ENCODER DEVICE FOR A ROTATIONAL SPEED SENSOR AND ROLLING-CONTACT BEARING EQUIPPED WITH SUCH A DEVICE

The invention relates to an encoder device for a bearing, in which a rotating member of the bearing carries the said encoder, consisting of a multipole-magnetization ring intended to generate a variable magnetic field in front of a sensor secured to a fixed element. Such a device makes it possible to determine the rotational speed of the rotating element supporting the encoder. Such a device can, for example, be mounted on a rolling-contact vehicle wheel bearing coupled to an antilock braking system of ABS type.

French Patent No. 2,655,735 (SKF) discloses a rotational speed sensor device in which the encoder, secured to the rotating race of the bearing, is placed facing the sensor element secured to the non-rotating race of the bearing.

In addition, published French Patent Application No. 2,700,588 (SNR) discloses a mounting device with a seal having an incorporated encoder. The encoder is mounted on the external side face of a disc mounted on a rotating support.

One drawback of these types of encoders resides in the fact that, since the multipole ring is arranged on the external face of a support, the active surface of the said encoder, intended to be opposite the sensor, is poorly protected and is particularly exposed to various damaging influences. Thus, if such an encoder is mounted on a bearing, the active surface can easily become damaged when the encoder is mounted in the bearing, or else when the bearing is handled. In operation, such types of encoders are not well protected against external damaging influences and may, in certain applications such as rolling-contact bearings for vehicle wheels, be subjected to splashes and various forms of contamination, which might in the long term impair the operating characteristics of the encoder.

The object of the invention is therefore an encoder device for a rotational speed sensor of the type described above, in which the encoder is perfectly isolated from the environment by effective protection means, without affecting the magnetic field emitted by the encoder.

A further object of the invention is to produce an encoder device for a speed sensor which has no risk of being damaged before or during mounting of the bearing.

A further object of the invention is to produce an encoder device for a speed sensor whose reliability is improved by virtue of such an encoder.

A further object of the invention is to produce an encoder in which the protection means are also rigid support means, in order to maintain accurate coaxial alignment of the encoder relative to the rolling-contact bearing.

According to the invention, the encoder device for a rotational speed sensor of a rotating member of a bearing mounted on a non-rotating member of the said bearing, of the type comprising a sensor which is secured to an element that is fixed relative to the non-rotating member and in front of which an element forming a rotor moves in rotation with a small air gap, which element is equipped with an encoder, is capable of producing in the sensor a periodic signal of frequency proportional to the speed of rotation of the rotor element. The encoder, in the form of a multipole magnetized ring, is fixed on an internal face of a rigid protection and support element made of nonmagnetic metallic material. A corresponding external face of the protection element moves in rotation in front of the said sensor.

In one embodiment of the invention, the protection and support element comprises at least one radial part in contact with the encoder.

In one embodiment of the invention, the sensor is arranged axially relative to the encoder and the encoder, with the protection and support element, is entirely housed inside the bearing.

Advantageously, the protection and support element may comprise a first axial part, fitted over the rotating member of the bearing, a radial part in contact with the encoder and a second axial part in contact with the encoder.

Advantageously, the protection and support element may comprise an axial part, fitted over the rotating member of the bearing and in contact with the encoder, a radial part in contact with the encoder and an oblique part extending towards the non-rotating member of the bearing.

In one embodiment of the invention, the protection and support element comprises at least one axial part in contact with the encoder. The protection and support element may be fitted over the external diameter of the rotating member of the bearing.

In one embodiment of the invention, the sensor is arranged radially relative to the encoder and the encoder projects relative to the bearing.

Advantageously, the encoder may be surrounded on three sides by the protection and support element.

In one embodiment of the invention, the bearing is equipped with a sealing means comprising a flexible seal cooperating with the said protection and support element.

In a preferred embodiment of the invention, one lip of a seal of the bearing is in contact with an axial part, fitted over the rotating member of the bearing, of the protection and support element.

Advantageously, a part, situated in proximity to the non-rotating member of the bearing, of the protection and support element, may be equipped with a lip seal in contact with the said non-rotating member of the bearing.

In another embodiment of the invention, a part, situated in proximity to the non-rotating member of the bearing, of the protection and support element is equipped with a lip seal in contact with a support of a seal of the bearing, secured to the non-rotating member of the bearing.

In one embodiment of the invention, an additional protection element comprises an axial part fitted over the non-rotating member of the bearing, in contact with a lip of a seal fixed on the protection and support element, and a radial part extending towards the rotating member of the bearing so as to form a narrow passage with the said rotating member of the bearing.

In another embodiment of the invention, the protection and support element comprises a part cooperating with the non-rotating member of the bearing to form a narrow passage.

In one embodiment of the invention, the encoder is moulded over the protection and support element. Advantageously, the protection and support element is provided with localized deformations or removals of material used for anchoring the encoder.

In another embodiment of the invention, the encoder is forcibly introduced into the protection and support element and the protection and support element is equipped with claws intended to be crimped into notches of the encoder.

In one embodiment of the invention, the encoder is held by an intermediate annular support, moulded over one face of an axial part of the protection and support element, which support is provided with a circular holding rib cooperating with a circular groove of the encoder.

Advantageously, the encoder is made of material loaded with magnetic particles, for example an elastomer or a plastic. The encoder may also be made of ferrite.

A further subject of the invention is a rolling-contact bearing equipped with an encoder device for detecting the rotational speed of its rotating race relative to its non-rotating race as described above.

The invention thus provides an encoder whose structure is such that the active part consisting of the multipole ring is protected effectively and in sealed fashion inside a non-magnetic metallic protection and support element and is held coaxially to the rolling-contact bearing.

The invention will become more clear on studying some embodiments described by way of examples implying no limitation and illustrated by the appended drawings, in which.

Figure 1:
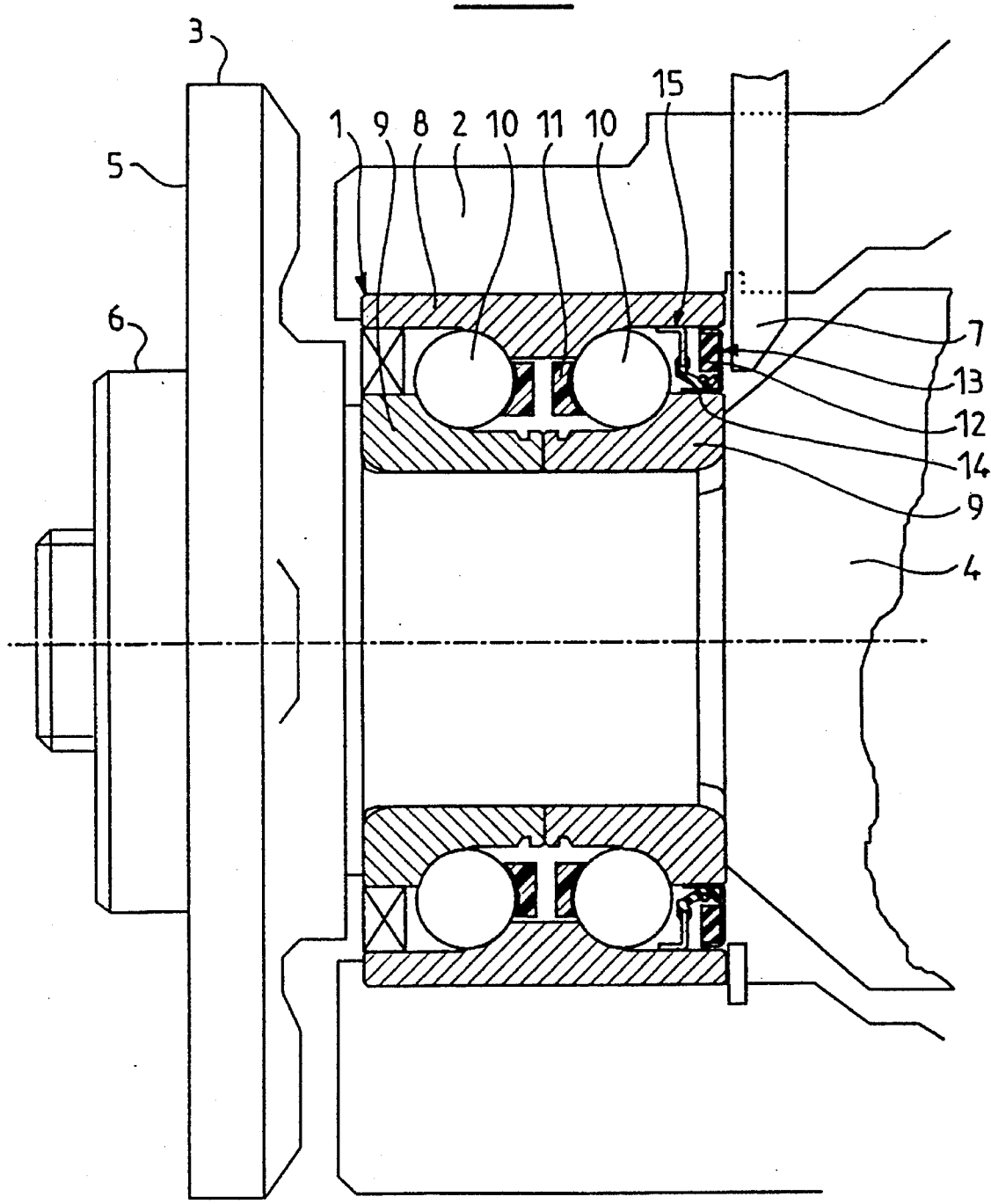
FIG. 1 is a view in axial section of a vehicle wheel hub equipped with a rolling-contact bearing with an encoder device for a speed sensor according to the invention.
Figure 2:
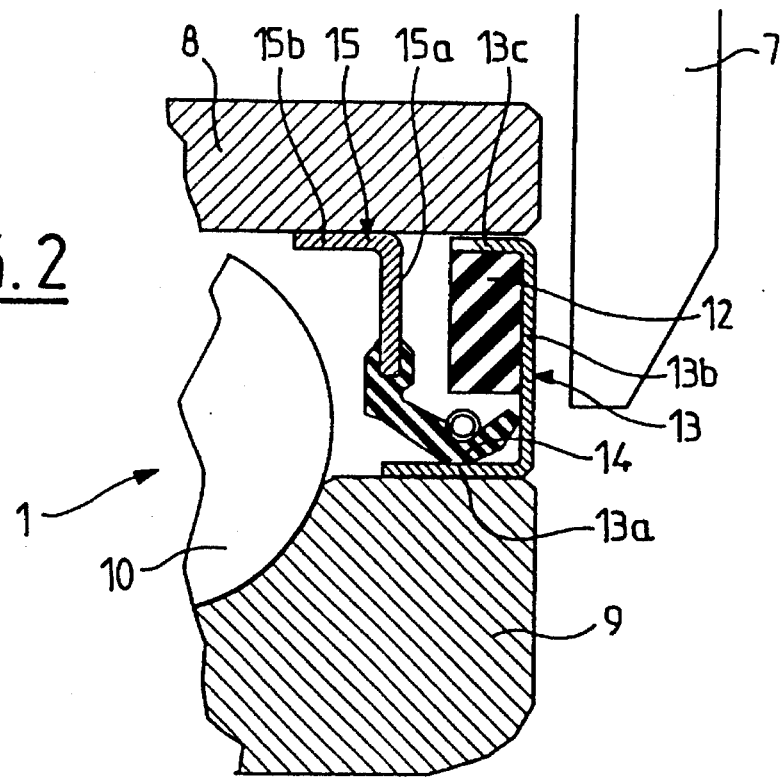
FIG. 2 is a detail view of the encoder device for a speed sensor of FIG. 1.

As illustrated on FIGS. 1 and 2, the invention can be applied to a rolling-contact bearing 1 mounted in a wheel hub of a motor vehicle not illustrated in the figure. The bearing 1 is mounted in a stub-axle carrier 2. The internal face of the bearing 1 is in contact with the wheel hub 3 which is driven in rotation by the drive shaft 4. The wheel hub 3 is equipped with support and centring bearing zones 5, 6 for the wheel. A sensor 7 is mounted fixed relative to the stub-axle carrier 2.

The rolling-contact bearing 1 comprises an external race 8 constituting the non-rotating member of the bearing 1, two internal half-races 9 forming the rotating member of the bearing 1, which are assembled side by side axially, and two rows of balls 10 distributed circumferentially between the external race 8 and the internal half-races 9 by means of a cage 11. The bearing is equipped with an encoder 12 arranged axially facing the sensor 7 and with a small separation. The magnetic encoder 12 consists of a multipole ring made, for example, of plastic or elastomer, loaded with magnetic particles. The encoder 12 is mounted on a protection and support element 13 fixed on the internal race 9. The encoder 12, secured to a rotating element, thus constitutes a rotor capable of producing a periodic voltage of frequency proportional to the rotational speed of the wheel.

The protection and support element 13 is rigid and made of non-magnetic material, for example an austenitic stainless steel or a Z50MIB-4 steel, and is of annular shape with an axial part 13a fitted over the internal race 9 of the bearing 1, a radial part 13b arranged facing the sensor 7 and in contact with the encoder 12, and a second axial part 13c also in contact with the encoder 12.

On the encoder side 12, the bearing 1 is equipped with a sealing means comprising a flexible seal 14 in frictional contact with a rotating element of the bearing, for example with the protection and support element 13, as illustrated in FIGS. 1 and 2. The seal 14 is mounted on the non-rotating race 8 of the bearing 1 by means of a support 15. The support 15 is composed of an axial part 15a, fitted over the external race 8, and of a radial part 15b, extending towards the internal race 9 and supporting the seal 14.

As represented in detail in FIG. 2, the encoder 12 and the protection and support element 13 are entirely housed in a space bounded by the rolling-contact bearing balls 10, the bore in the external race 8, the radial plane passing through the axial end of the races 8 and 9 of the bearing 1 and the external diameter of the internal race 9. The seal 14, equipped with its support 15, is also housed in the same space. The sensor 7 is fixed to a non-rotating part of the device, for example to the stub-axle carrier 2, and extends radially towards the axis of the bearing, so as to be facing the encoder 12.

The axial part 13a of the protection and support element 13 of the encoder 12 has an internal diameter such that it can be fitted over a bearing zone of the internal race 9. The radial part 13b extends the axial part 13a at its end closer to the sensor 7. The encoder 12 is fixed by any suitable means, such as adhesive bonding, over-moulding or other means, on the internal faces of the radial 13b and the axial 13c parts of the protection and support element 13.

The encoder 12 thus arranged is protected effectively by the protection and support element 13 which forms a cover against any risk of damage by impact, scratching, contamination or splashing, without the magnetic field emitted by the encoder 12 being affected, since the protection and support element 13 is made of non-magnetic metal. Such an encoder 12 is furthermore less sensitive to metal particles than an encoder of the prior art.

Possible metal particles, originating from the brake disks, for example, are actually separated from the magnetic part of the encoder 12 by the thickness of the non-magnetic protection support 13. The magnetic attraction force is therefore less strong and the said particles can more easily be expelled by centrifugal effect during rotation of the encoder 12. The radial part 13b of the protection and support element 13 is flush with the front surface bounding the races 8 and 9 of the bearing 1, so as to be close to the sensor 7. Since the protection and support element 13 is rigid, the encoder 12 is firmly attached to the internal race 9 and cannot become misaligned relative thereto. Possible rotational eccentricities that result in air-gap variations which impair the reliability of the rotational speed measurement are thus eliminated.

The seal 14 mounted on the support 15 is housed in the space bounded by the rolling-contact bearing balls 10 and the encoder 12 with its protection and support element 13. The seal 14 is in frictional contact with the external surface of the first axial part 13a of the protection and support element 13.

FIGS. 3 to 7 illustrate particular embodiments, showing the way in which the encoder 12 is fixed in the protection and support element 13, similar elements having the same references.

Figure 3:
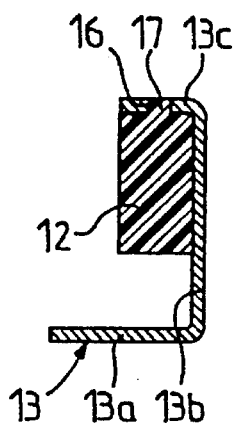
FIGS. 3, 4, 5 and 6 are variants of the encoder device for a speed sensor of FIG. 2.

As represented in FIG. 3, the encoder 12 is made of plastic loaded with magnetic particles and is mounted on a protection and support element 13, the combination of the encoder 12 and the protection and support element 13 being mounted in a rolling-contact bearing in the same way as that represented in FIG. 2. The protection and support element 13 comprises a first axial part 13a, intended to be fitted over the internal race of the bearing, a radial part 13b, in contact with the encoder 12 and intended to be facing the sensor, and a second axial part 13c, extending at an angle back into the rolling-contact bearing. The second axial part 13c of the protection and support element 13 is provided with a plurality of through-holes 16 intended to be filled by the plastic of the encoder 12 when the encoder 12 is moulded over the protection and support element 13. Thus, after over-moulding, the encoder 12 includes a plurality of local protuberances 17 which fill the volume of the holes 16. In this way, the encoder 12 is securely fixed to the protection and support element 13.

Figure 4:
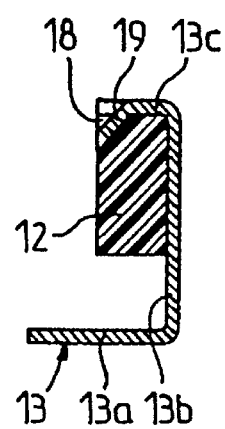
Figure 7:
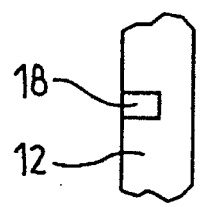
FIG. 7 is a detail plan view of the variant of FIG. 4.

On FIGS. 4 and 7, the encoder 12 and the protection and support element 13 are intended to be arranged in a rolling-contact bearing in the same way as that represented in FIG. 2. The encoder 12 is provided, at its end in contact with the second axial part 13c of the protection and support element 13, with a plurality of notches 18 intended to cooperate with a plurality of claws 19 which are cut in the free end of the second axial part 13c of the protection and support element 13 and then folded back. The encoder 12 is installed at its final location in contact with the radial part 13b and the second axial part 13c of the protection and support element 13, then the claws 19 are folded into the notches 18 so as to immobilize the encoder 12.

Figure 5:
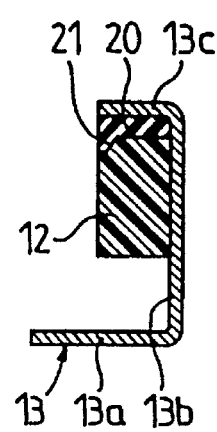

In FIG. 5, the encoder 12 and the protection and support element 13 are intended to be installed in a rolling-contact bearing in the same way as that represented in FIG. 2. The protection and support element 13 is also the same as that represented in FIG. 2. The encoder 12, made of plastic, is housed inside an intermediate annular support 20, made of elastomer and moulded over the internal face of the second axial part 13c of the protection and support element 13. The intermediate support 20 is provided with a circular rib 21 intended to hold axially the encoder 12 which is provided with a circular groove cooperating with the lip 21.

Figure 6:
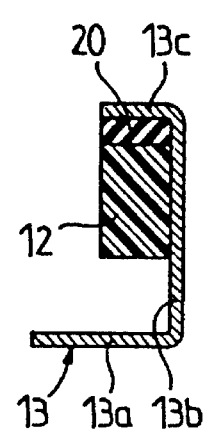

In FIG. 6, the encoder 12 and the protection and support element 13 are similar to those of FIG. 5, with the exception that the support 20 of the encoder 12 does not have a holding rib and has a rectangular cross-section. The support 20 is moulded over the internal face of the second axial part 13c of the protection and support element 13, then the plastic part of the encoder 12 is fitted over the support 20.

Figure 8:
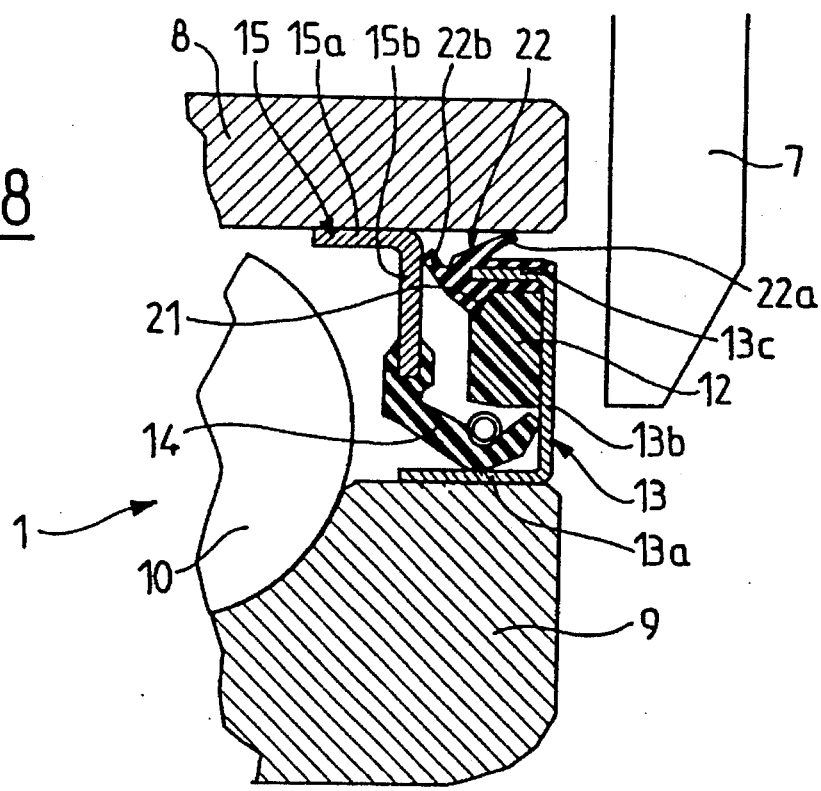
FIG. 8 is a detail view in axial section of an encoder device for a speed Sensor according to another embodiment of the invention.
Figure 9:
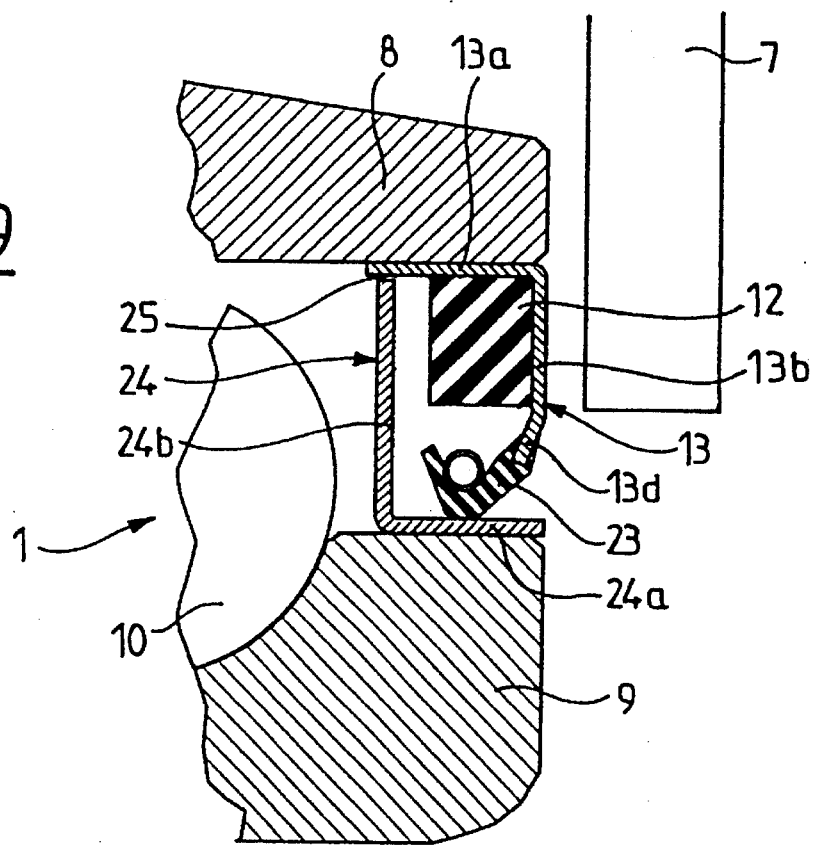
FIG. 9 is a detail view in axial section of an encoder device for a speed sensor according to another embodiment of the invention.

FIGS. 8 and 9 illustrate two variants.

The elements similar to those of the variant illustrated in FIGS. 1 and 2 have the same references.

As represented in FIG. 8, the bearing 1 is equipped with a non-rotating external race 8, with a rotating internal race 9, with rolling-contact bearing balls 10, with a magnetic encoder 12 mounted on a protection and support element 13 and with a seal 14 mounted on a support 15. A sensor 7, secured to an element that is fixed relative to the external race, is arranged axially facing and at a short distance from the encoder 12. The protection and support element 13 comprises a first axial part 13a, fitted over the internal race 9, a radial part 13b extending towards the external race 8, and a second axial part 13c, extending at an angle back into the bearing 1. The seal 14 cooperates with the external face of the first axial part 13a of the protection and support element 13 and is mounted on a support 15 which is fitted over the external race 8 by an axial part 15a and is equipped with a radial part 15b supporting the seal 14.

The encoder 12 is housed radially in an intermediate annular support 22, made of flexible synthetic material, moulded over the second axial part 13c of the protection and support element 13. The intermediate support 22 is provided with a circular holding rib 21 and fulfils the function of a second seal by virtue of two lips 22a, 22b. The first lip 22a is in frictional contact with the bore of the external race 8, and the second lip 22a is in frictional contact with the external front surface of the radial part 15b of the support 15 of the seal 14. Thus mounted, the encoder 12 is completely protected from the external elements by which it is in danger of being damaged, since it is enclosed in the space bounded by the external 8 and internal 9 races of the bearing 1, the protection and support element 13, the support 22, the seal 14 and the support 15.

As represented in FIG. 9, the bearing 1 is equipped with an external race 8 constituting the rotating member of the bearing 1, with an internal race 9 constituting the non-rotating member of the bearing 1, with rolling-contact bearing balls 10, with an encoder 12 mounted on a protection and support element 13, with a seal 23 and with an additional protection element 24. A sensor 7, secured to an element that is fixed relative to the non-rotating member of the bearing 1, is arranged facing and at a short distance from the encoder 12. The protection and support element 13 comprises an axial part 13a fitted into the bore of the rotating external race 8, a radial part 13b arranged between the encoder 12 and the sensor 7 and flush with the external front surface of the bearing 1 and extended by an oblique part 13d extending towards the non-rotating internal race 9. The oblique part 13d of the protection and support element 13 supports a seal 23 in frictional contact with the additional protection element 24.

The additional protection element 24 comprises an axial part 24a, fitted over the non-rotating internal race 9 and in contact with the seal 23 supported by the protection element 13, and a radial part 24b, extending the axial part 24a at its end which is in proximity to the balls 10. The radial part 24b of the additional protection element 24 extends towards the rotating external race 8 and cooperates with the axial part 13a of the protection and support element 13, so as to form a narrow passage 25 fulfilling the function of a labyrinth seal. The encoder 12 is therefore enclosed in the space bounded by the external 8 and internal 9 races of the bearing 1, the protection element 13, the seal 23, the additional protection element 24 and the labyrinth seal formed by the narrow passage 25. The encoder 12 is thus protected from external damaging influences.

Figure 10:
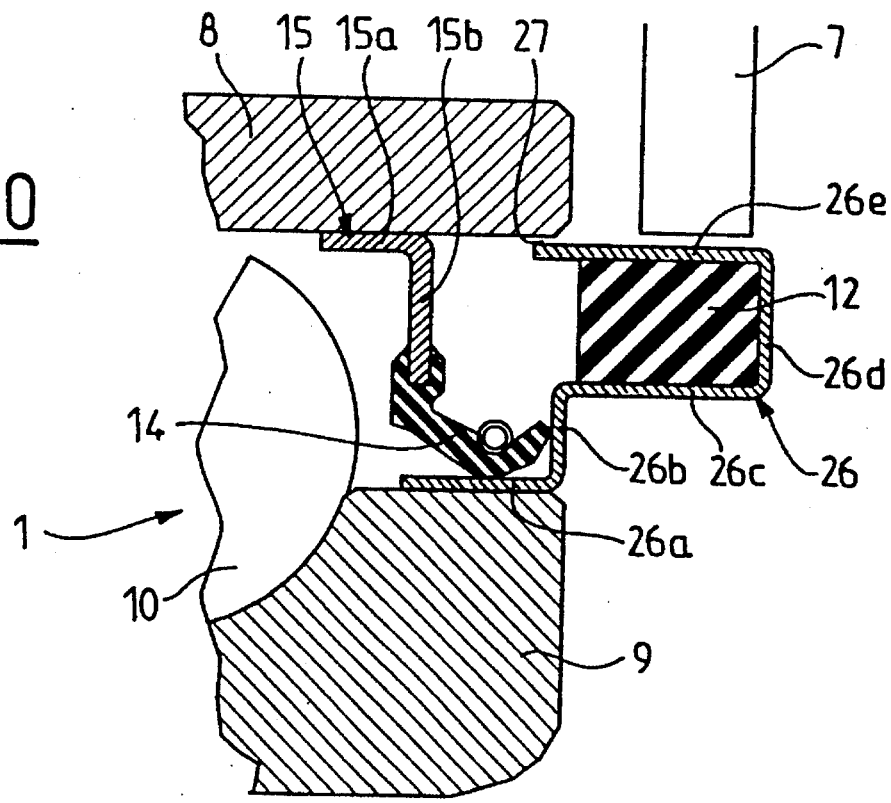
FIGS. 10, 11 and 12 are detail views in axial section of an encoder device for a speed sensor according to other embodiments of the invention, in which the encoder is arranged radially relative to the sensor.
Figure 11:
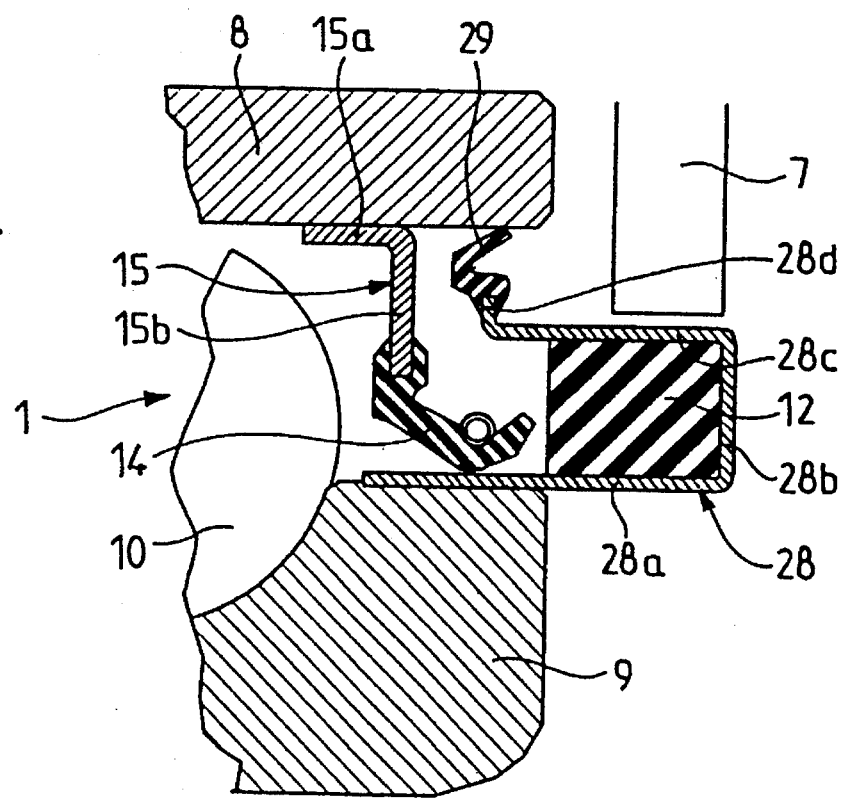
Figure 12:
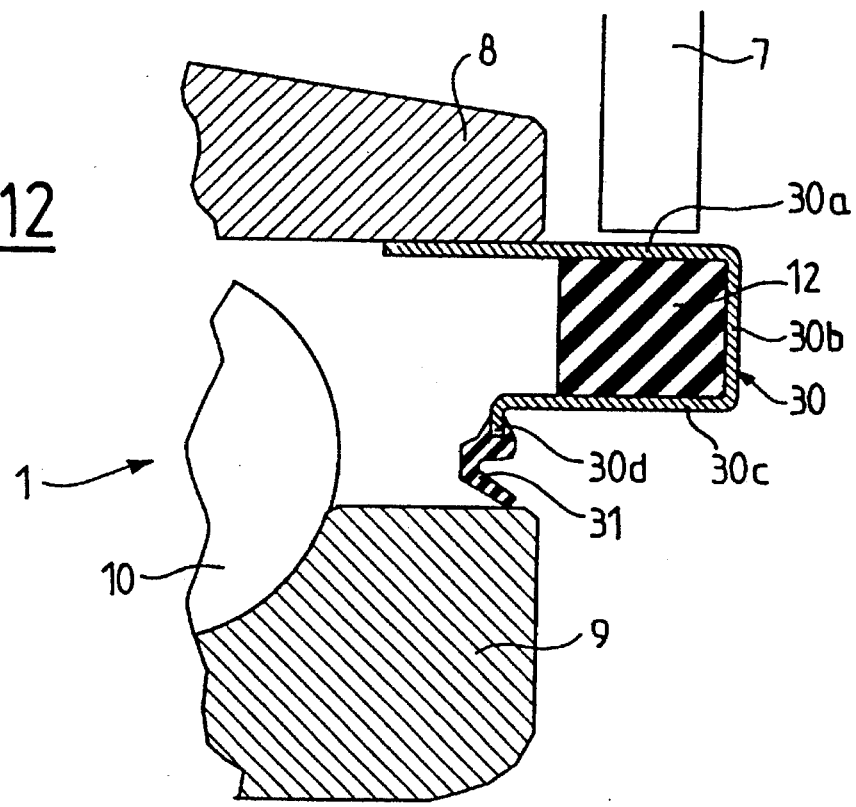

FIGS. 10 to 12 illustrate another variant, in which the encoder is arranged outside the rolling-contact bearing and the sensor acts radially.

The elements similar to the preceding variants have the same references.

As represented in FIG. 10, the bearing 1 comprises a non-rotating external race 8, a rotating internal race 9, rolling-contact bearing balls 10, an encoder 12 protected by a protection and support element 26 and a seal 14 mounted on a support 15. A sensor 7, secured to an element that is fixed relative to the non-rotating race of the bearing 1, is arranged radially this time relative to the encoder, still at a short distance therefrom. The encoder 12 is surrounded on three sides by the protection and support element 26 and projects relative to the external front surface of the rolling-contact bearing 1. The seal 14 is supported by a support 15 secured to the non-rotating external race 8 of the bearing 1 and is in frictional contact with an external face of a first axial part 26a of the protection and support element 26. The first axial part 26a of the protection and support element 26 is fitted over the rotating internal race 9.

The protection and support element 26 furthermore comprises a first radial part 26b, extending the first axial part 26a at its end outside the bearing 1 and extending towards the external race 8 of the bearing 1, a second axial part 26c, extending the first radial part 26b at its end opposite the first axial part 26a, in contact with the encoder 12 and extending away from the bearing 1, a second radial part 26d extending the second axial part 26c at its end opposite the first radial part 26b, in contact with the encoder 12 and extending towards the external race 8, and a third axial part 26e, extending the second radial part 26d at its end opposite the second axial part 26c, in contact with the encoder 12 and extending towards the external race 8, so as to form with the said external race 8 a narrow passage 27. The sensor 7 is situated facing the external face of the encoder 12, that is to say in proximity to the external face of the third axial part 26e of the protection and support element 26.

The encoder 12 is thus enclosed on three sides by the parts 26c, 26d and 26e and is thus perfectly protected by the protection and support element 26. In addition, the narrow passage fulfils the role of a labyrinth seal and thus prevents water, mud or any other foreign element from coming into contact with the encoder 12.

As represented in FIG. 11, the bearing 1 comprises a non-rotating external race 8, a rotating internal race 9, rolling-contact bearing balls 10, an encoder 12 protected by a protection and support element 28 and a seal 14 mounted on a support 15. A sensor 7 is arranged radially relative to the encoder 12 which projects relative to the rolling-contact bearing 1. The seal 14 and its support 15 are the same as those represented in FIG. 10.

The protection and support element 28 comprises a first axial part 28a fitted over the rotating internal race 9 in contact with the encoder 12 and projecting relative to the bearing 1, a radial part 28b extending the first axial part 28a at its end outside the bearing 1 in contact with the encoder 12 and extending towards the external race 8, a second axial part 28c extending the radial part 28b at its end opposite the first axial part 28a in contact with the encoder 12 and extending into the bearing 1, and an end part 28d extending towards the non-rotating external race 8 and equipped with a seal 29 in frictional contact with a bearing zone of the non-rotating external race 8. The sensor 7 is arranged radially relative to the encoder 12 and is situated in proximity to the external face of the second axial part 28c of the protection and support element 28.

The encoder 12 is therefore, as in the embodiment of FIG. 10, enclosed on three sides by the protection and support element 28 and perfectly protected. In addition, the seal 29 completely seals the space which houses the encoder and is bounded by the protection and support element 28, the seal 14, the support 15, the external race 8 and the seal 29. The balls 10 of the bearing 1 are also protected from the outside by the seal 14 and by the seal 29.

As represented in FIG. 12, the bearing 1 comprises a rotating external race 8, a non-rotating internal race 9, rolling-contact bearing balls 10 and an encoder 12 with its protection and support element 30. The encoder 12 projects axially relative to the bearing 1 and the sensor 7 secured to an element that is fixed relative to the non-rotating race of the bearing 1 and is arranged radially facing the said encoder 12.

The protection and support element 30 comprises a first axial part 30a fitted over the rotating external race 8 in contact with the encoder 12 and projecting relative to the bearing 1, a radial part 30b extending the first axial part 30a at its end outside the bearing 1 in contact with the encoder 12 and extending towards the internal race 9, a second axial part 30c extending the radial part 30b at its end opposite the first axial part 30a in contact with the encoder 12 and extending into the bearing 1, and an end part 30d extending towards the non-rotating internal race 9.

A lip seal 31 is moulded over the end part 30d of the protection and support element 30 and is in frictional contact with a bearing zone of the non-rotating internal race 9. The sensor 7 is arranged radially facing an external face of the first axial part 30a of the protection and support element 30.

The encoder 12 is thus perfectly protected against external damaging influences by the parts 30a, 30b and 30c of the protection and support element 30, which enclose it on three sides. The fourth side of the encoder 12 is open towards the interior of the bearing 1, the seal 31 preventing any intrusion of foreign elements into the bearing 1. This variant is particularly economical, because the protection and support element 30 has a two-fold function of protection and support for the encoder 12 and of support for the seal 31.

Figure 13:
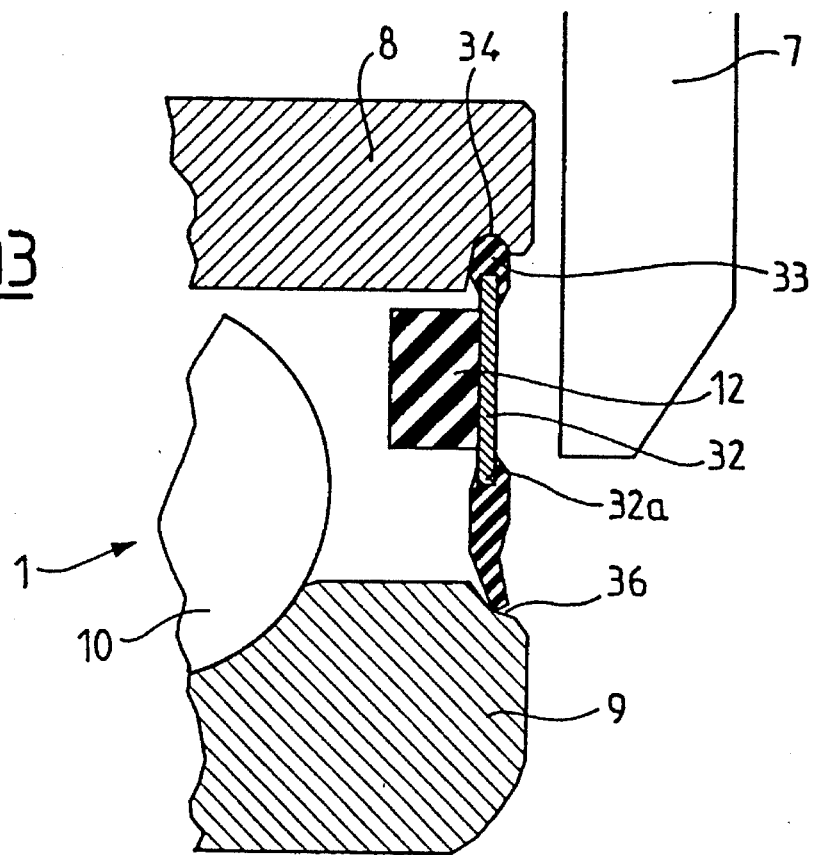
FIG. 13 is a detail view in axial section of an encoder device for a speed sensor according to another embodiment of the invention.

FIG. 13 illustrates yet another variant of the invention, in which the encoder is arranged inside the rolling-contact bearing and the sensor acts axially. The elements similar to the preceding variants have the same references.

As represented in FIG. 13, the bearing 1 comprises a rotating external race 8, a non-rotating internal race 9, rolling-contact bearing balls 10 and an encoder 12 mounted on a protection and support element 32. The protection and support element 32 is composed a radial annular plate, of which the side facing the interior of the bearing 1 carries the encoder 12, and of which the side facing the exterior of the bearing 1 is situated axially facing and at a short distance from the sensor 7. The protection and support element 32 is fixed on the rotating external race 8 of the bearing 1 by means of a peripheral annular bead 33 of elastomer, moulded over the said protection and support element 32 and cooperating with a groove 34 made in the bore of the external race 8.

The bearing 1 is sealed by a seal 35, moulded over the internal perimeter of the protection and support element 32 and in frictional contact with an oblique bearing zone 36 of the non-rotating internal race 9 of the bearing 1. The encoder 12 is fixed on the internal face of the protection and support element 32, axially facing the sensor 7. The encoder 12 and the protection and support element 32 are housed entirely within the bearing 1 and do not extend beyond the external radial surface of the bearing 1.

Figure 14:
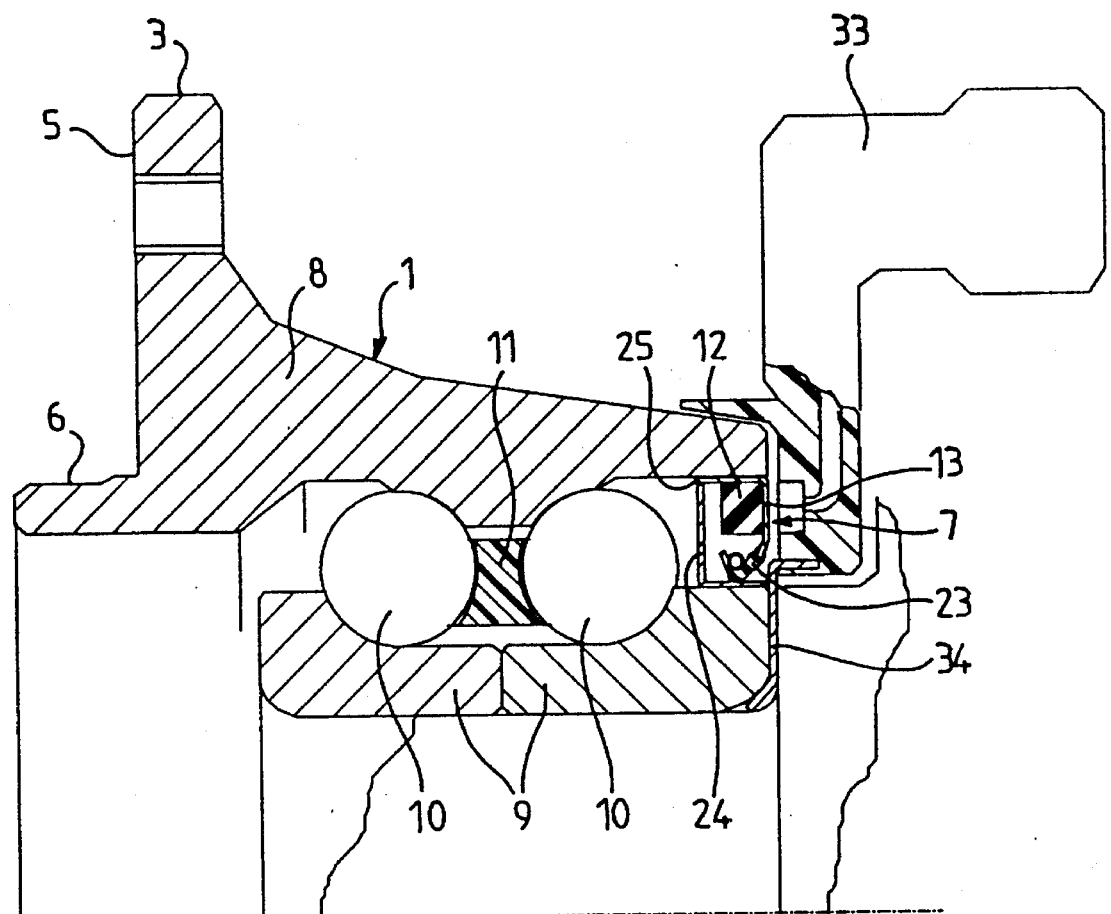
FIG. 14 is a view in axial half-section of an encoder device mounted on the rotating external race of a rolling-contact bearing.
Figure 15:
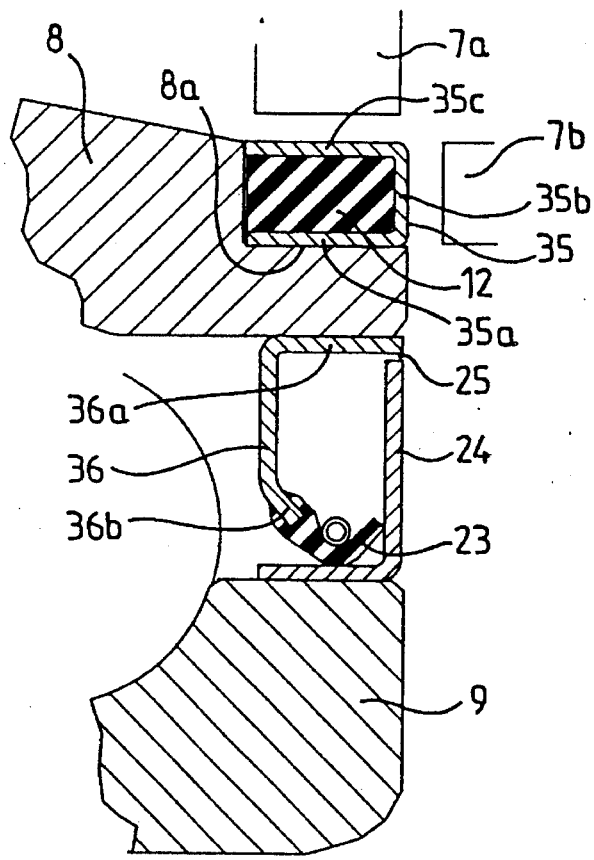
FIG. 15 is a detail view of one embodiment of the invention, in which the encoder is mounted on the external diameter of the external race.
Figure 16:
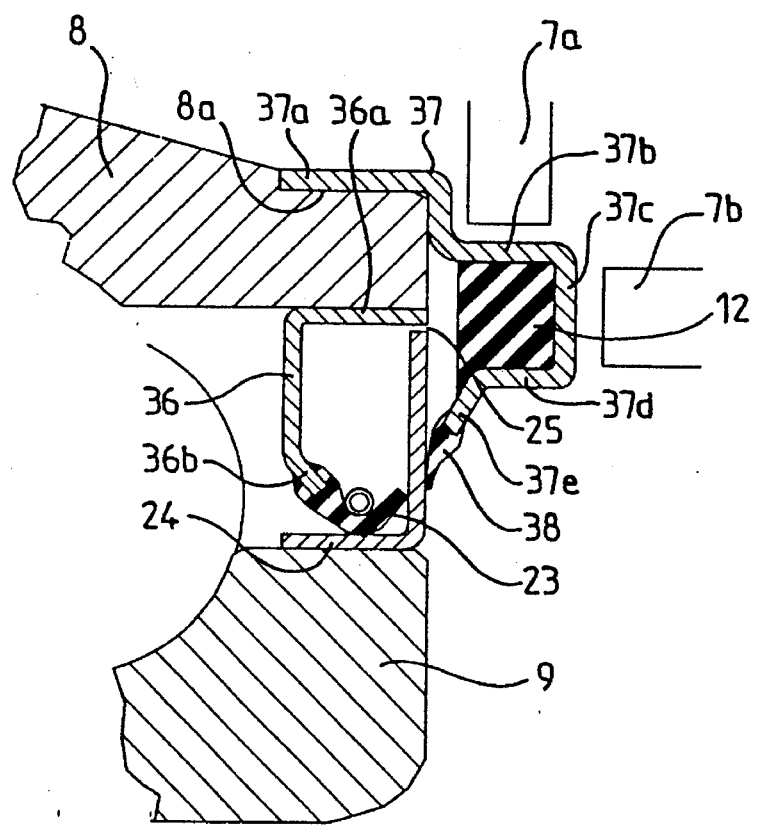
FIG. 16 is a detail view of a variant of FIG. 15.

In FIGS. 14 to 16, the elements similar to the preceding variants have the same references.

On FIG. 14, the rolling-contact bearing 1 comprises a rotating external race 8 and two non-rotating internal races 9. The external race 8 acts as a wheel hub 3 and is therefore intended to support a wheel and, in general, a brake disk, these not being represented. The encoder 12, the protection and support element 13, the seal 23 and the additional protection element 24 are the same as those represented in FIG. 9. The sensor 7 is secured to a connector 33 intended to connect it to means (not shown) for processing the signals emitted by the sensor 7. This sensor is mounted on a mounting support 34 secured to an internal half-race 9.

In FIG. 15, the external race 8 is provided on its external diameter with a cylindrical bearing zone 8a for mounting the protection and support element 35. The protection and support element 35 is annular and comprises, in cross-section, a cylindrical internal branch 35a mounted on the bearing zone 8a of the external race 8, a radial part 35b and a cylindrical external branch 35c. The encoder 12 is mounted between the internal 35a and external 35c branches of the protection and support element 35. The free end of the external branch 35c comes into contact with the external race 8. The encoder 12 is thus entirely isolated from the environment, in the space defined by the protection and support element 35 and the external race 8. This embodiment allows two possible positions 7a, 7b for mounting the sensor relative to the encoder 12. In position 7a, the sensor is facing the encoder 12 radially. In contrast, in position 7b the sensor is facing the encoder 12 axially.

A seal 23 is arranged between the external 8 and internal 9 races. The seal 23 is moulded over the free end 36b of a support cover 36, the other free end 36a of which forms a cylindrical part fitted over a bore of the rotating race 8. The seal 23 is in frictional contact on a bearing zone of an additional protection element 24 which forms a narrow passage 25 with the free end 36a of the support cover 36.

In FIG. 16, the sealing means are the same as those of the preceding figure. The protection and support element 37 comprises a cylindrical part 37a fitted over the mounting bearing zone 8a of the rotating race 8. The protection and support element 37 also comprises a cylindrical external branch 37b, a radial part 37c and a cylindrical internal branch 37d, which form an annular space which is closed on three sides and in which the encoder 12 is arranged. The cylindrical internal branch 37d is extended, towards the rolling-contact bearing, by a free end 37e over which an additional seal 38 is moulded, which seal is in frictional contact with the additional protection element 24. The encoder is thus entirely protected within the space defined by the cylindrical external branch 37b, the radial part 37c and the cylindrical internal branch 37d of the protection and support element 37, the additional seal 38, the additional protection element 24 and the external race 8. As in FIG. 15, the sensor can be mounted in two positions 7a and 7b relative to the encoder 12. In position 7a, the sensor is facing the encoder 12 radially, and in position 7b the sensor is facing the encoder 12 axially.

By virtue of the invention, and regardless of the alternative embodiment, the encoder of the rotational speed sensor assembly is entirely protected against the damaging influences of external elements, such as water, sand or dust. Furthermore, the encoder is also protected against impacts which may occur during handling before or during the mounting of the bearing on the mechanical members with which it comes into contact. For this reason, the reliability of the speed measurement is thereby enhanced.

We claim:

1. Encoder device for a rotational speed sensor of a rotating member of a bearing mounted on a non-rotating member of the said bearing, of the type comprising a sensor which is secured to an element that is fixed relative to the non-rotating member and in front of which an element forming a rotor moves in rotation with a small air gap, which element is equipped with an encoder capable of producing in the sensor a periodic signal of frequency proportional to the speed of rotation of the rotor element, wherein the encoder, in the form of a multipole magnetized ring, is fixed on an internal face of a rigid protection and support element made of nonmagnetic metallic material, a corresponding external face of the said protection element moving in rotation in front of the said sensor.

2. Encoder device according to claim 1, wherein the protection and support element comprises at least one radial part in contact with the encoder.

3. Encoder device according to claim 2, wherein the sensor is arranged axially relative to the encoder and the encoder, with the protection and support element, is entirely housed inside the bearing.

4. Encoder device according to claim 2, wherein the protection and support element comprises a first axial part, fitted over the rotating member of the bearing, a radial part in contact with the encoder and a second axial part in contact with the encoder.

5. Encoder device according to claim 2, wherein the protection and support element comprises an axial part, fitted over the rotating member of the bearing and in contact with the encoder, a radial part in contact with the encoder and an oblique part extending towards the non-rotating member of the bearing.

6. Encoder device according to claim 1, wherein the protection and support element comprises at least one axial part in contact with the encoder.

7. Encoder device according to claim 6, wherein the protection and support element is fitted over the external diameter of the rotating member of the bearing.

8. Encoder device according to claim 6, wherein the sensor is arranged radially relative to the encoder and the encoder projects relative to the bearing.

9. Encoder device according to claim 6, wherein the encoder is surrounded on three sides by the protection and support element.

10. Encoder device according to claim 1, wherein the bearing is equipped with a sealing means comprising a flexible seal cooperating with the said protection and support element.

11. Encoder device according to claim 1, wherein one lip of a seal of the bearing is in contact with an axial part, fitted over the rotating member of the bearing, of the protection and support element.

12. Encoder device according to claim 1, wherein a part, situated in proximity to the non-rotating member of the bearing, of the protection and support element, is equipped with a lip seal in contact with the said non-rotating member of the bearing.

13. Encoder device according to claim 1, wherein a part, situated in proximity to the non-rotating member of the bearing, of the protection and support element is equipped with a lip seal in contact with a support of a seal of the bearing, secured to the non-rotating member of the bearing.

14. Encoder device according to claim 1, characterized by an additional protection element comprising an axial part fitted over the non-rotating member of the bearing, in contact with a lip of a seal fixed on the protection and support element, and a radial part extending towards the rotating member of the bearing 80 as to form a narrow passage with the said rotating member of the bearing.

15. Encoder device according to claim 1, wherein the protection and support element comprises a part cooperating with the non-rotating member of the bearing to form a narrow passage.

16. Encoder device according to claim 1, wherein the encoder is moulded over the protection and support element.

17. Encoder device according to claim 15, wherein the protection and support element is provided with localized deformations or removals of material used for anchoring the encoder.

18. Encoder device according to claim 1, wherein the encoder is forcibly introduced into the protection and support element and the said protection and support element is equipped with claws intended to be crimped into notches of the encoder.

19. Encoder device according to claim 1, wherein the encoder is held by an intermediate annular support, moulded over one face of an axial part of the protection and support element, the said intermediary support being furthermore provided with a circular holding rib cooperating with a circular groove of the encoder.

20. Encoder device according to claim 1, wherein the encoder is made of material loaded with magnetic particles.

21. Rolling-contact bearing equipped with an encoder for a device for detecting the rotational speed of its rotating race relative to its non-rotating race according to claim 1.

* * * * *